United States Patent
Ruoff et al.

(10) Patent No.: US 6,593,018 B2
(45) Date of Patent: Jul. 15, 2003

(54) APPARATUS FOR FURNISHING A REACTION MIXTURE FOR A REFORMING CATALYST OF A FUEL CELL ASSEMBLY, AND METHOD FOR ITS OPERATION

(75) Inventors: Manfred Ruoff, Moeglingen (DE); Michael Nau, Dornhan/Aischfeld (DE); Marc Bareis, Markgroeningen (DE); Frank Ilgner, Karlsruhe (DE); Horst Harndorf, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 249 days.

(21) Appl. No.: 09/759,169

(22) Filed: Jan. 16, 2001

(65) Prior Publication Data

US 2001/0009731 A1 Jul. 26, 2001

(30) Foreign Application Priority Data

Jan. 19, 2000 (DE) .......................................... 100 02 006

(51) Int. Cl.[7] ................................................. H01M 8/04
(52) U.S. Cl. ........................... 429/22; 429/17; 429/19; 429/21; 429/26; 429/40
(58) Field of Search .............................. 429/17, 22, 40, 429/19, 26, 21

(56) References Cited

U.S. PATENT DOCUMENTS 5,066,421 A   11/1991   Giacobbe ..................... 252/373
5,741,474 A   4/1998   Isomura et al. ............. 423/648

FOREIGN PATENT DOCUMENTS

EP        985 635 A1      3/2000
EP        0985635 A1 *   3/2000      ............. C01B/3/48

* cited by examiner

*Primary Examiner*—Patrick Ryan
*Assistant Examiner*—Angela J Martin
(74) *Attorney, Agent, or Firm*—Ronald E. Greigg

(57) ABSTRACT

The invention relates to an apparatus for furnishing a reaction mixture for a reforming catalyst of a fuel cell assembly, having
  a) an air infeed with means for regulating an air flow rate;
  b) a fuel infeed with means for regulating a fuel flow rate;
  c) a water vapor generator with means for regulating a water vapor flow rate;
  d) a liquid water infeed with means for regulating a liquid water flow rate; and
  e) a control unit, which communicates with the liquid water infeed, the water vapor generator, the fuel infeed, and the air infeed; and
  via the control unit, controlling variables for the fuel infeed, the liquid water infeed, the water vapor generator and the air infeed which are furnished as a function of a power demand to the fuel cell and as a function of an operating phase of the apparatus.

16 Claims, 3 Drawing Sheets

APPARATUS FOR FURNISHING A REACTION MIXTURE FOR A REFORMING CATALYST OF A FUEL CELL ASSEMBLY, AND METHOD FOR ITS OPERATION

FIELD OF THE INVENTION

The invention relates to an apparatus for furnishing a reaction mixture for a reforming catalyst of a fuel cell assembly and to a method for operating such an apparatus.

BACKGROUND OF THE INVENTION

As legal requirements in terms of pollutant emissions in vehicles have become more stringent, the importance of fuel cells for automotive use has increased markedly. In principle, the emission of greenhouse gases such as carbon dioxide can be prevented entirely. Fuel cells are currently operated on the basis of hydrogen. However, at present the problem of hydrogen storage in the vehicle has not been solved satisfactorily. As an alternative, hydrogen can be generated directly where it is to be used, by reforming or partial oxidation of hydrocarbons (methane, gasoline, diesel, methanol). Although such a process necessarily also creates carbon dioxide, markedly higher efficiency is nevertheless achieved by the direct conversion of the chemically bound energy into electrical energy.

In use, so-called PEM (polymer electrolyte membrane) fuel cells have proven especially advantageous. Such fuel cells tolerate only very slight traces of carbon monoxide in the fuel gas, however, so that typically the fuel cell is preceded by suitable oxidation converters. For hydrogen generation, a reaction mixture is passed through a reforming catalyst, for instance based on noble metal, that is located in a reactor. The reactor usually has a catalytically coated honeycomb structure or a catalyst bulk fill, in order to speed up the chemical conversion of the reaction mixture.

The actual reforming process at the reforming catalyst, depending on the composition of the reaction mixture, comprises a complex interplay between reversible and irreversible redox reactions. The reaction mixture comprises air, hydrocarbons and water.

For automotive use of fuel cells, considerable technical problems exist in addition to the actual reforming process. For instance because of a dynamic power demand by the vehicle driver, an increased hydrogen flow rate is necessary. Furnishing an adequate hydrogen flow rate immediately after cold starting has been equally unsatisfactorily solved. These problems are due in particular to the fact that the furnishing of water for the reaction mixture is done in the prior art in the form of water vapor. In cold starting, the requisite means for generating the water vapor, such as water vapor generators, are not yet at an adequate operating temperature. The water infeed is therefore inadequate. In the event of an increased power demand to the fuel cell, the water vapor flow rate can be increased only with a marked delay. To remedy this, hydrogen storage media are known, which in the travel situations described furnish hydrogen, but also involve disadvantages such as poor operating safety, greater weight and volume, and a high price.

OBJECT AND SUMMARY OF THE INVENTION

The disadvantages of the prior art can be overcome by the apparatus according to the invention for furnishing a reaction mixture for the reforming catalyst and the method for operating the apparatus. The apparatus comprises a) an air infeed with means for regulating an air flow rate;
b) a fuel infeed with means for regulating a fuel flow rate;
c) a water vapor generator with means for regulating a water vapor flow rate;
d) a liquid water infeed with means for regulating a liquid water flow rate; and
e) a control unit, which communicates with the liquid water infeed, the water vapor generator, the fuel infeed, and the air infeed.

Because via the control unit, controlling variables for the fuel infeed, the liquid water infeed, the water vapor generator and the air infeed are furnished as a function of a power demand to the fuel cell and as a function of an operating phase of the apparatus, the cold starting and dynamic performance can be quickly adapted to actual requirements.

Advantageously, the liquid water infeed is increased both in the cold starting phase and upon an increase in the power demand to the fuel cell. For infeeding fuel and liquid water, the apparatus has respective regulating valves, which can be triggered electromagnetically, hydraulically or pneumatically. As a spray insert, such regulating valves preferably have a swirl insert or a multiple-hole insert for generating a spray, in order to produce a reaction mixture that is as homogeneous as possible.

The infeeding of the fuel and of the liquid water can be done spatially separately from one another or directly in the same region, either in the inflow line to the reactor or directly in the reactor. It has proved especially preferably to feed both components directly into the reactor, since here the liquid water infeed can be simultaneously for cooling a valve seat of the regulating valve of the fuel infeed.

In a further, especially advantageous feature of the latter arrangement of the fuel and water infeeding, the water cooling in the region of the liquid water infeed has a switching valve or an adjustable throttle valve for setting the water pressure. In this way, the pressure required to generate the spray can be generated in the region of the spray insert. For such an application, it has proved to be advantageous to use a diaphragm spring element to seal the reactor. By prestressing the diaphragm springs, the desired opening pressure, at which a formation of water vapor bubbles is prevented and the requisite atomization quality can be achieved can be set. For metering purposes, a metering pump, proportional valve or clocking valve is accordingly always required in the inflow. For cooling purposes, a switching valve or proportional valve can be provided in the outflow of the needle seat of the fuel valve.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
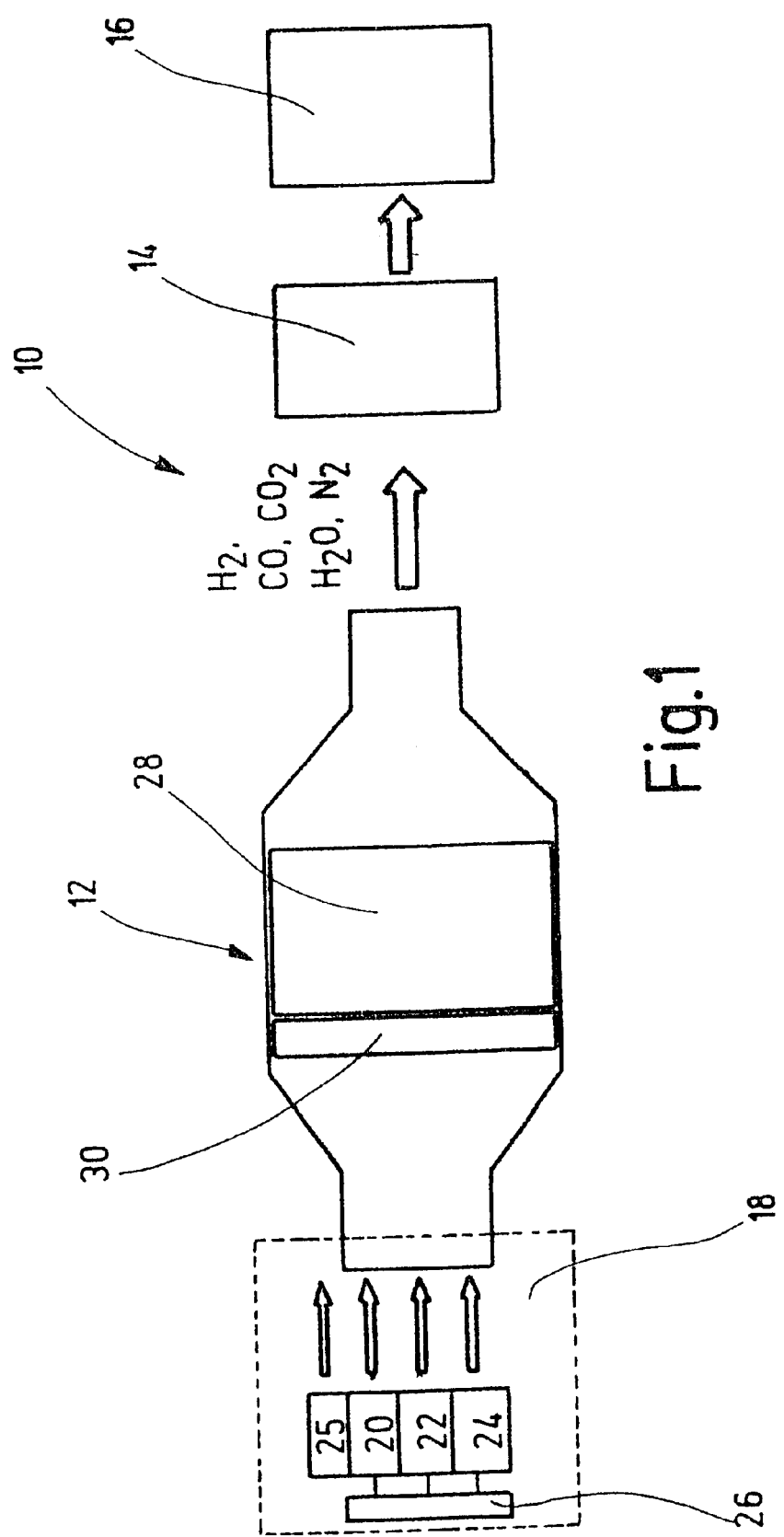
FIG. 1 is a schematic view of a fuel cell assembly and an apparatus for furnishing a reaction mixture for a reforming catalyst.

FIG. 1 in a schematic view shows a fuel cell assembly 10, which includes a reactor 12, a carbon monoxide converter 14, and the actual fuel cell 16. An apparatus 18 that serves to furnish a reaction mixture is associated with the reactor 12. The apparatus 18 itself comprises an air infeed 20, a fuel infeed 22, a water vapor generator 24, a liquid water infeed 25, and a control unit 26.

For operation of the fuel cell 16, hydrogen is needed as fuel gas. For safety reasons, it has proved to be advantageous not to generate the hydrogen until on site with the aid of catalytically reductive processes. The so-called reforming process takes place in a reforming catalyst 28 inside the reactor 12. Catalysts 28 of this kind are usually based on noble metals, which are introduced into the reactor 12 in the form of a bulk fill or a catalytically coated honeycomb structure. Optionally, a region 30 of the catalyst 28 can be used—for instance with the aid of a suitable resistor—to attain a necessary operating temperature. Such catalysts 28 are known and will therefore not be described further at this point.

It is also known for carbon monoxide, possibly produced during the reforming process, to be oxidized by means of the converter 14. This is necessary especially if the fuel cell 16 is embodied on the basis of a proton-conducting polymer membrane (PEM fuel cell), since such a fuel cell can tolerate only traces of carbon monoxide.

Suitable reaction mixtures contain, in addition to water and air, a fuel such as methane, gasoline, diesel or methanol. Compositions of such reaction mixtures that lead to the highest possible conversion with regard to the hydrogen to be generated are known. With the aid of the apparatus 18 according to the invention, the educt flow rates can now be varied in addition, if a hydrogen flow rate is to be varied, for instance as a consequence of a power demand to the fuel cell 16.

With the aid of the control unit 26, controlling variables for the fuel infeed 22, the liquid water infeed 25, the water vapor generator 24 and the air infeed 20, respectively, are furnished, which lead to a setting of the appropriate educt flow rates. To that end, the air infeed 20 has means, not shown here, for regulating an air flow rate, such as throttle valves or adjustable throttle valves. The fuel and liquid water infeed 22, 25 as well as the generator 24 must also be equipped with means that can serve to regulate a fuel flow rate, a liquid water flow rate, and a water vapor flow rate, respectively. Means of this kind can likewise be found in the prior art.

A water infeed (in liquid or vapor form) can be done with the aid of the water vapor generator 24 in the form of water vapor or by means of the liquid water infeed 25, in particular in the form of a spray. The generation of water vapor and the requisite devices will not—since they are known—be addressed in further detail here. Both the liquid water infeed 25 and the fuel infeed 22 can be controlled with the aid of a respective regulating valve. A special embodiment of the invention, in which such regulating valves are used, will be described in further detail hereinafter in terms of an exemplary embodiment. At this point, it should be stated in advance that it has proved to be advantageous to use electromagnetically, hydraulically or pneumatically regulatable valves. For generating a spray, these valves preferably have a spray insert, in particular in the form of a swirl insert or a multiple-hole insert.

Figure 2:
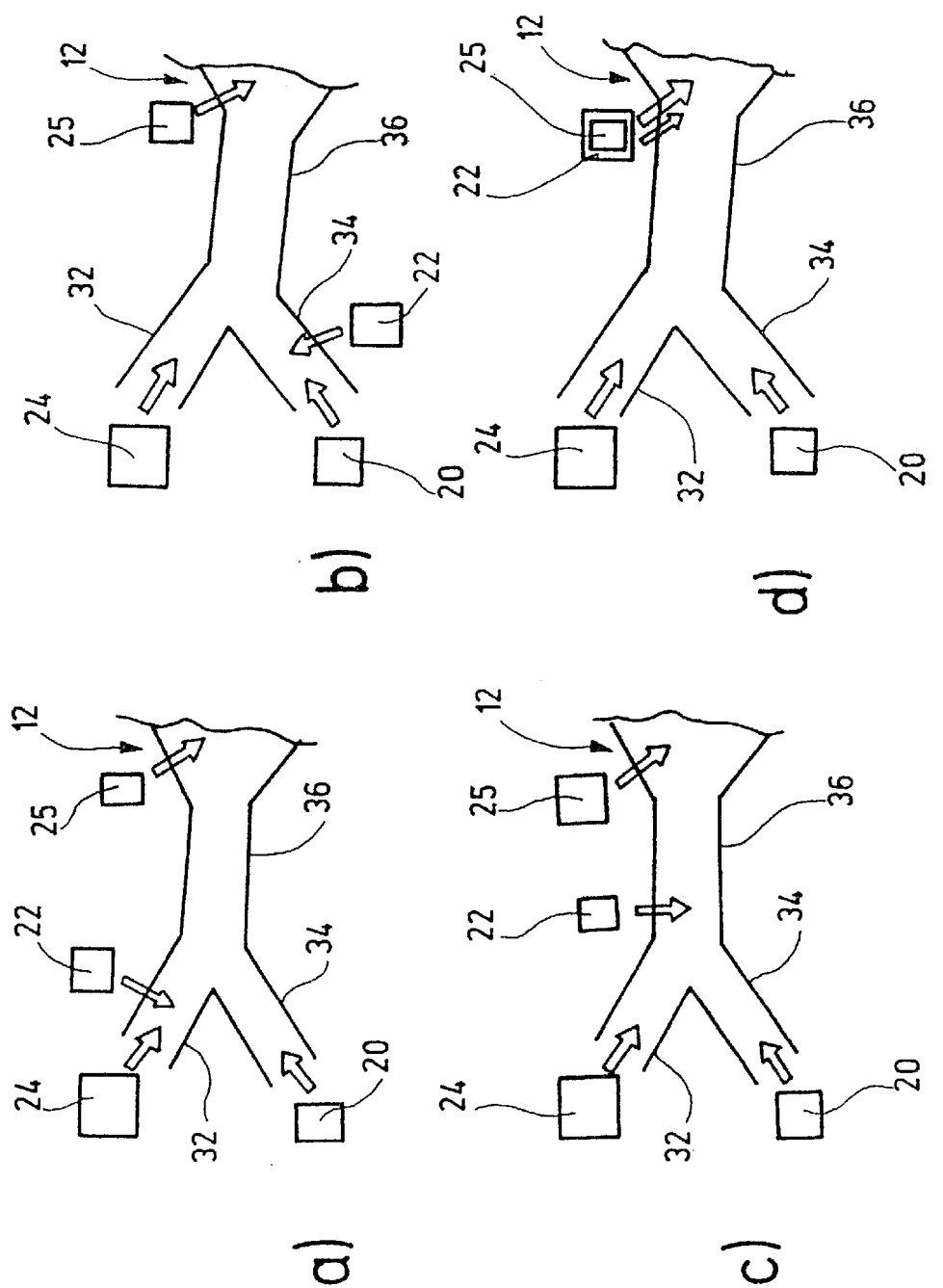
FIG. 2 provides four schematic illustrations on the spatial arrangement of individual components of the apparatus.

The infeeding of the various educts (air, water, fuel) can be done spatially separately from one another. FIG. 2 shows a total of four exemplary embodiments, in which the relative disposition of the fuel infeed 22 is varied, as examples. The water vapor generator 24 and the air infeed 20 have two separate inflow lines 32, 34, which discharge into a common inflow line 36 for the reactor 12. In exemplary embodiments (a) and (b), the fuel infeed 22 is associated either directly with the inflow line 32 of the water vapor generator 24 or with the inflow line 34 of the air infeed 20. This kind of early infeeding of fuel can lead to an especially homogeneous distribution of the fuel in the reaction mixture, especially whenever the fuel has evaporated completely before striking the catalyst 28.

In exemplary embodiment (c), the infeeding of the fuel does not take place until the inflow line 36, or in other words as the mixing of the air flow and the water vapor is beginning or even has already concluded. To effect a homogeneous distribution of the fuel, the fuel infeed 22 must have a spray insert with high atomization quality.

Figure 3:
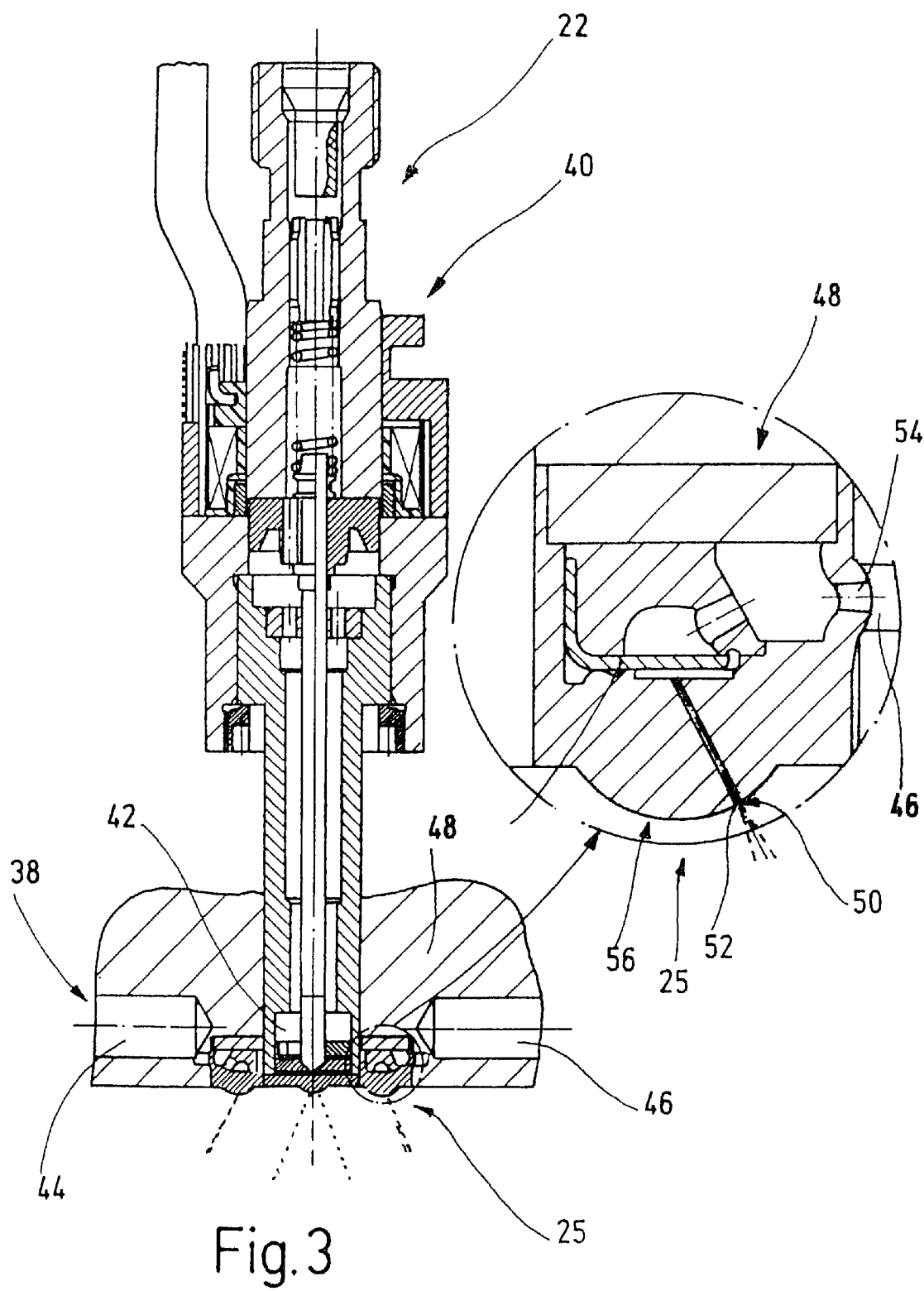
FIG. 3 is a sectional view through a combined liquid water and fuel infeed.

The liquid water infeed 25 can also be done directly into the reactor 12, and can be combined structurally—as seen from the exemplary embodiment (d)—with the fuel infeed 22. FIG. 3 shows one example of an embodiment of such a combined fuel and liquid water infeed 22, 25. The liquid water infeed 25 itself is in turn integrated with a radiator 38, which serves to dissipate heat in the region of the valve seat of a fuel valve 40 of the fuel infeed 22. In the use of the fuel valve 40, recourse can be had to known versions, for instance in the field of direct gasoline injection in Otto engines. The fuel valve 40 here has a switching valve for metering purposes, such as a swirl insert 42 for atomizing the fuel. It is also conceivable to use a multiple-hole insert as the spray insert.

The water cooling 38 comprises a water inlet 44 and water outlet 46, which are integrated with a reactor wall 48; the coolant also flows through the liquid water infeed 25 (see in particular the enlarged detail in FIG. 3). In order to attain the requisite spray properties (Sauter diameter, spray angle), the water pilot pressure must be adapted to the geometry of the spray insert. In the exemplary embodiment shown, the spray insert comprises a multiple-hole insert 50, on which the various spray holes 52 are disposed, preferably symmetrically, over the circumference. A pressure increase in the region of the liquid water infeed 25 can be attained by closure of a switching valve. The switching valve in FIG. 3 is merely a hole 54 or a nozzle. The actual switching valve for water infeeding is not shown and is located behind the hole 54. As an alternative to this, an adjustable throttle valve can be provided, with the aid of which at least a rudimentary coolant flow can still be maintained even during the liquid water infeeding. With the rise of the internal water pressure in the liquid water infeed 25, the liquid water flow rate can additionally be controlled, if—as shown in the exemplary embodiment—an outflow of the water is enabled only beyond a predetermined pressure. To that end, the spray holes 52 are initially sealed off by a diaphragm spring element 56. By the prestressing of the diaphragm spring element 56, the desired opening pressure, which should preferably be selected such that the formation of water vapor bubbles is averted and the requisite atomization quality is attained, can be set.

The advantages of the apparatus 18 can be illustrated especially simply in a cold starting phase and in the event of an increased power demand through the fuel cell 16. In the cold starting phase, the water vapor generator 24 cannot yet assure an adequate water vapor flow rate. In such a case, the furnishing of the water occurs solely via the liquid water infeed 25, until the water vapor generator 24 is operationally ready. In the event of an increased power demand from the vehicle driver, the water vapor generation cannot be increased abruptly but instead is done only with a certain delay. Both the delay and the pressure increase can be avoided by simultaneous infeeding of liquid water via the liquid water infeed 25.

The controlling variables required to control the individual components 20, 22, 24, 25 are predetermined by the control unit 26. To that end, the control unit 26 is connected in a known way to sensors, which provide information on the operating states of the components 20, 22, 24, 25, the fuel cell 16, and the reaction mixture. Optionally, additional operating parameters, such as a control angle of an accelerator pedal, can be used as well.

The foregoing relates to preferred exemplary embodiments of the invention, it being understood that other variants and embodiments thereof are possible within the spirit and scope of the invention, the latter being defined by the appended claims.

We claim:

1. An apparatus for furnishing a reaction mixture for a reforming catalyst of a fuel cell assembly, having
   a) an air infeed (20) with means for regulating an air flow rate;
   b) a fuel infeed (22) with means for regulating a fuel flow rate;
   c) a water vapor generator (24) with means for regulating a water vapor flow rate;
   d) a liquid water infeed (25) with means for regulating a liquid water flow rate; and
   e) a control unit (26), which communicates with the liquid water infeed (25), the water vapor generator (24), the fuel infeed (22), and the air infeed (20).

2. The apparatus in accordance with claim 1, in which the fuel infeed (22) includes a regulating fuel valve (40).

3. The apparatus in accordance with claim 1, in which the liquid water infeed (25) includes a regulating valve.

4. The apparatus in accordance with claim 2, in which the liquid water infeed (25) includes a regulating valve.

5. The apparatus in accordance with claim 2, in which the regulating valve can be regulated electromagnetically, hydraulically or pneumatically.

6. The apparatus in accordance with claim 3, in which the regulating valve can be regulated electromagnetically, hydraulically or pneumatically.

7. The apparatus in accordance with claim 4, in which the regulating valve can be regulated electromagnetically, hydraulically or pneumatically.

8. The apparatus in accordance with claim 5, in which the regulating valve (40) includes a spray insert, in particular a swirl insert (42) or a multiple-hole insert (50).

9. The apparatus in accordance with claim 6, in which the regulating valve (40) includes a spray insert, in particular a swirl insert (42) or a multiple-hole insert (50).

10. The apparatus in accordance with claim 7, in which the regulating valve (40) includes a spray insert, in particular a swirl insert (42) or a multiple-hole insert (50).

11. The apparatus in accordance with claim 2, in which the fuel valve (40) in the region of the valve seat includes a water cooling means (38).

12. The apparatus in accordance with claim 11, in which the water cooling means (38) in its outlet (46) has a switching valve or proportional valve.

13. The apparatus in accordance with claim 3, in which the liquid water infeed (25) is integrated with the water cooling means (38).

14. The apparatus in accordance with claim 11, in which the liquid water infeed (25) is integrated with the water cooling means (38).

15. The apparatus in accordance with claim 13, in which the water cooling means (38) in the region of the liquid water infeed (25), in the inlet (44), has a switching valve, an adjustable throttle valve, a clocking valve, a metering pump, or a proportional valve for setting a water pressure.

16. The apparatus in accordance with claim 15, in which a diaphragm spring element (56) is seated sealingly, up to a predetermined water pressure, in front of an outlet opening (spray holes (52)) of the reactor.

\* \* \* \* \*